United States Patent
Brooker et al.

(10) Patent No.: US 12,504,714 B2
(45) Date of Patent: Dec. 23, 2025

(54) OPTICAL METROLOGY WITH INCOHERENT HOLOGRAPHY

(71) Applicant: CellOptic, Inc., Rockville, MD (US)

(72) Inventors: Gary Brooker, Rockville, MD (US); Nisan Siegel, Silver Spring, MD (US)

(73) Assignee: CELLOPTIC, INC., Rockville, MD (US)

(*) Notice: Subject to any disclaimer, the term of this patent is extended or adjusted under 35 U.S.C. 154(b) by 461 days.

(21) Appl. No.: 18/074,050

(22) Filed: Dec. 2, 2022

(65) Prior Publication Data

US 2023/0104022 A1 Apr. 6, 2023

Related U.S. Application Data

(63) Continuation of application No. PCT/US2021/035426, filed on Jun. 2, 2021.

(60) Provisional application No. 63/033,401, filed on Jun. 2, 2020.

(51) Int. Cl.
| | |
|---|---|
| G03H 1/00 | (2006.01) |
| G01N 21/95 | (2006.01) |
| G01N 21/956 | (2006.01) |
| G03H 1/04 | (2006.01) |
| G03H 1/08 | (2006.01) |

(52) U.S. Cl.
CPC ....... *G03H 1/0005* (2013.01); *G01N 21/9505* (2013.01); *G01N 21/95684* (2013.01); *G03H 1/0443* (2013.01); *G03H 1/0866* (2013.01); *G03H 2001/0044* (2013.01)

(58) Field of Classification Search
CPC .. G03H 1/0005; G03H 1/0443; G03H 1/0866; G03H 2001/0044; G03H 2210/55; G03H 2001/0038; G03H 1/041; G03H 2001/005; G03H 2001/0883; G03H 2222/24; G03H 2223/20; G03H 2240/56; G03H 1/06; G01N 21/9505; G01N 21/95684; G01N 21/9501; G06V 10/147; G06T 7/001
USPC ......................................................... 430/1
See application file for complete search history.

(56) References Cited

U.S. PATENT DOCUMENTS

| | | | |
|---|---|---|---|
| 2012/0050832 A1* | 3/2012 | Rosen | G03H 1/0443 359/25 |
| 2012/0095982 A1* | 4/2012 | Lennington | G06V 20/00 707/E17.069 |

* cited by examiner

Primary Examiner — Caleen O Sullivan
(74) Attorney, Agent, or Firm — Nixon & Vanderhye P.C.

(57) ABSTRACT

An advance in high-resolution optical metrology has been achieved by the introduction of incoherent holographic imaging. FINCH, an example of incoherent holography, is shown to simplify the process, eliminating many steps in metrology and at the same time increasing throughput, resolution and accuracy of the method. A proposed technique requires only a single image capture with a non-moving camera rather than the capture of multiple stacks of images requiring many camera exposures and movement of the camera or sample in the conventional techniques.

4 Claims, 19 Drawing Sheets

OPTICAL METROLOGY WITH INCOHERENT HOLOGRAPHY

CROSS REFERENCE TO RELATED APPLICATIONS

This application is a continuation application of, and claims priority to, PCT Application No. PCT/US2021/035426 filed Jun. 2, 2021, which claimed priority to U.S. Provisional Application No. 63/033,401 filed Jun. 2, 2020, the entire contents of both applications are hereby incorporated by reference.

TECHNICAL FIELD

This disclosure generally relates to performing optical metrology using incoherent holography, and more particularly to measuring the dimensions, orientations and surface smoothness or other physical characteristics of structures by interpreting the incoherent hologram of the structures.

BACKGROUND ART

The advent of pervasive electronics, optics, and computing has been enabled by the production of ever more capable electronic circuits with ever smaller and more complex structures. In order for devices with these components to be produced efficiently at high quality, it is necessary to perform quality control checks at numerous points during the manufacturing process. These quality control checks include metrology of various types, measuring the dimensions, orientations and surface characteristics of structures that are on the size scale from multiple microns down to nanometer scale. Quality control checks may be performed by individual people (technicians) or by automated means including machine vision systems and artificial intelligence. For future reference the term "quality control assessor" will be used and encompasses both people and automated means of performing quality checks. A quality control assessor must be enabled to inspect and assess the quality of a given set of products (which may include devices or device components), which may sometimes be a subset of the total set of produced products, and decide whether the inspected products are of sufficient quality to be brought to market. This is a critical step since if the products are not passed by the quality control assessor, the manufacturer loses the investment it made in the products, and may have to change suppliers or their own methods or another aspect of their production process. Structures on the larger end of this scale may easily be measured from simple optical images, but for smaller structures on the order of less than half a micron, performing such measurements reliably with simple optical imaging is more difficult. There are methods that are better suited for direct measurements in this size range, including scanning electron microscopy (SEM), transmission electron microscopy (TEM), x-ray imaging, and others; however, these methods are generally expensive, difficult to perform quickly in manufacturing environments, and may require the destruction of the sample being measured. Thus methods for high-resolution optical metrology that move beyond simple optical imaging are being developed to take advantage of their low cost and capability for manufacturing process integration.

One representative method for high-resolution optical metrology is Through-focus Scanning Optical Metrology (TSOM), which is used to measure isolated features of an object and which is discussed here in context of measuring the width of a line feature in the object under inspection. TSOM (see FIGS. 1 and 2) is a way to make nanometer-scale measurements with normal optical-wavelength imaging by referencing measurements of production objects to measurements of known and well-characterized "exemplar" structures, which include exemplars of desired high quality production objects and exemplars of defective production objects. The TSOM workflow 100 is divided into two parts, 110 the creation of the metrology map reference library from exemplars and 120 the measurement of the production objects, which are further explained in the TSOM schematic 200 in the operations 210 creation of the metrology map of the desired exemplar, 220 creation of metrology maps of known defective exemplars, and 230 creation of metrology maps of production object under inspection. TSOM is an effective metrology tool but it requires recording (operation 111) scores of images while either simultaneously 213 moving the sample by tens of microns or 212 the imaging camera by tens of millimeters, or changing the focal length of the camera lens used to record the images, which are undesirable characteristics since they take time and require relative motion of the part being inspected, a process that has limited accuracy and repeatability. Briefly, the object under inspection 231 is translated through the focal plane of an imaging system (generally a microscope) by some method, and images are recorded at a plurality of imaging planes including the focal plane and many out-of-focus planes. Line profiles of image intensity across the measurement structure region of interest (ROI) in the object (in this example, the line feature) are collected from each of the through-focus images. The line profiles are assembled into an XZ image plot, and this XZ plot is called a TSOM image (also referred to in this document as a metrology map). In order to use this metrology map of the object under inspection, it must be compared 123, 232 to pre-calibrated metrology maps of features of comparable characteristics, including exemplars of "desired" feature characteristics as well as exemplars of undesired "defect" characteristics. In the simple example discussed herein, desired exemplars would have exactly the desired line width, and defect exemplars would comprise a set of lines with widths known to be too narrow or too wide by a precisely known amount. In 111, 112, and 210, a well-characterized reference standard object containing a desired exemplar 211 of the type of structure to be measured is brought through the focus of an imaging system to create a standard reference TSOM image (metrology map) 214. Following this, in 111, 112, and 220 a library of well-characterized defective structures 221, 222, 223 is imaged in the same way, and difference (D-TSOM) images are constructed from the image differences between the TSOMs of the reference structure and the known defective structures. The patterns of minute differences in each D-TSOM image are then indexed to each defect structure by type and magnitude of the defect to create a library of comparative metrology maps that can be used to diagnose the quality of the object feature under inspection 112, 113, 224. In 120 and 230, parts being manufactured can be tested for unknown defects by 121, 122, 230 imaging them in the same way. In 123, 232 their metrology maps (D-TSOM images) are compared to the library of defect metrology maps (D-TSOM images) to characterize the quality of the manufacturing samples being tested. This comparison can be performed by human inspection technicians or by automated machine vision or artificial intelligence inspection systems. One figure of merit used in the metrology assessment is the Optical Image Range (OIR), which is effectively a measure of the contrast in a TSOM image. In D-TSOM images, higher OIR values are a function of larger differences of the test object from the standard reference and are a quantitative measurement that can be used in manufacturing quality inspection to accept or reject parts.

TSOM metrology requires the recording and assembly of a plurality images 111, 213. Either type of motion that could be used to generate TSOM data, sample or camera motion, involves added complication and expense, requiring that the motion is perfectly repeatable, calibrated and linear. TSOM-type metrology would be considerably improved by the relaxation or elimination of these motion requirements and the imaging with resolution beyond optical limits discussed before. Furthermore, the generation of the data set also requires a significant amount of time to record a stack of many (typically on the order of 100) images and the storage space to record all the images, and reducing the amount of image-captures would present further advantages in the form of reduced time needed for the measurement, and reduced data storage.

SUMMARY OF EXAMPLE EMBODIMENTS OF THE INVENTION

A method of performing optical metrology that can non-destructively create high-resolution measurements of structures on the nanometer scale from a single captured exposure would provide great advantages over prior optical metrology. Holographic image recording is a way to capture the three-dimensional (3D) information about an object in a single image. However, conventional holography requires the use of coherent interferometers, which are sensitive but which are generally also degraded by the vibrations and other environmental factors likely to be encountered in a manufacturing quality control environment, and which also subject to image degradation in the form of coherent speckle. One type of holography that elides these disadvantages is known as incoherent holography, which may also be referred to as self-referenced holography, self-interference digital holography, or one of several other methods that may be generally used to perform Incoherent Holographic Imaging (IHI). As a class, IHI methods characteristically record holograms with no coherent speckle, while also being very sensitive to the shape of the object being recorded. Crucially, in holography including IHI, the image information from any individual point of the object impinges upon a large area of the image detector, meaning that the recorded image contains many points bearing object information about each point, as opposed to the small area and few image points containing information about a given object point that is the case with standard imaging. This distribution of the object light onto the image detector confers much greater metrology sensitivity to IHI than standard imaging.

The most well-developed IHI method is called FINCH holography, for Fresnel Incoherent Correlation Holography. FINCH is able to create incoherent holograms with twice the resolution of normal optical imaging, and can do so in a robust manner in a single exposure with the highest possible operational stability due to its status as a single-optical-path method with inherently stable interferometer alignment. Thus example embodiments of the instant invention of Optical Metrology with Incoherent Holography are described in the context of FINCH imaging but one skilled in the art will realize that embodiments can be practiced with other IHI methods as well.

Accordingly, one object of the present disclosure is to provide a method in which light received from the object under inspection (the "metrology object") is used to create an incoherent self-interference FINCH hologram that is recorded by a camera. The hologram, which contains three-dimensional (3D) information about the object, is then processed by computational methods to create a through-focus map of a particular feature of the object to be measured, similar to a TSOM metrology map. The method includes taking measurements of reference object features for use as a comparison library, and then taking measurements of sample objects and measuring their features by referencing their metrology maps to the library of reference maps.

Another object of the present disclosure is to provide a method in which light received from the metrology object is used to create an incoherent self-interference FINCH hologram that is recorded by a camera. The FINCH hologram is computed to reconstruct the phase of the metrology object, and the phase of an object feature is used directly as the metrology map for said feature. The method includes taking phase measurements of reference object features for use as a comparison library, and then taking measurements of sample objects and measuring their features by referencing their phase metrology maps to the library of reference FINCH phase feature metrology maps.

Another object of the present disclosure is to provide a method in which light received from the metrology object is used to create an incoherent self-interference FINCH hologram that is recorded by a camera. The FINCH hologram is computed to reconstruct the phase of the metrology object, and the phase of the whole object is used directly as the metrology map. The method includes recording holograms of reference objects and computing their whole object phases for use as a reference library, and then taking measurements of sample objects and measuring them by referencing their phase metrology maps to the library of reference phase metrology maps.

Another object of the present disclosure is to provide a method in which light received from the object under inspection (the "metrology object") is used to create an incoherent self-interference FINCH hologram that is recorded by a camera. The hologram, which contains three-dimensional (3D) information about the object, is then processed by computational methods to create a through-focus map of a particular feature of the object to be measured, similar to a TSOM metrology map. The method includes using extremely accurate computational modeling to create computationally simulated reference metrology maps from manufacturing plans of desired and defective structures for use as a reference library, and then taking measurements of sample objects and measuring their features by referencing their metrology maps to the library of reference maps.

Another object of the present disclosure is to provide a method in which light received from the metrology object is used to create an incoherent self-interference FINCH hologram that is recorded by a camera. The FINCH hologram is computed to reconstruct the phase of the metrology object, and the phase of an object feature is used directly as the metrology map for said feature The method includes using extremely accurate computational modeling to create computationally simulated reference phase feature metrology maps from manufacturing plans of desired and defective structures, and then taking measurements of sample objects and measuring their features by referencing their phase metrology maps to the library of reference FINCH phase feature metrology maps.

Another object of the present disclosure is to provide a method in which light received from the metrology object is used to create an incoherent self-interference FINCH hologram that is recorded by a camera. The FINCH hologram is computed to reconstruct the phase of the metrology object, and the phase of the whole object is used directly as the metrology map. The method includes using extremely accurate computational modeling to create computationally simulated reference phase metrology maps from manufacturing plans of desired and defective structures, and then taking measurements of sample objects and measuring their features by referencing their phase metrology maps to the library of reference phase metrology maps.

Another object of the present disclosure is to provide a method in which light received from the metrology object is used to create an incoherent self-interference FINCH hologram that is recorded by a camera. The FINCH hologram is computed to reconstruct the phase of the metrology object, and the phase of the object is used directly as the metrology map. The method includes using extremely accurate computational modeling to create a computationally simulated reference phase metrology map from the manufacturing plan of the object, and analyzing unknown features of the sample metrology object observed in its phase metrology map by iteratively altering the manufacturing plan and computationally modeled phase metrology map until the features of the sample are matched by the computer model.

DESCRIPTION OF EXAMPLE EMBODIMENTS

Figure 1:
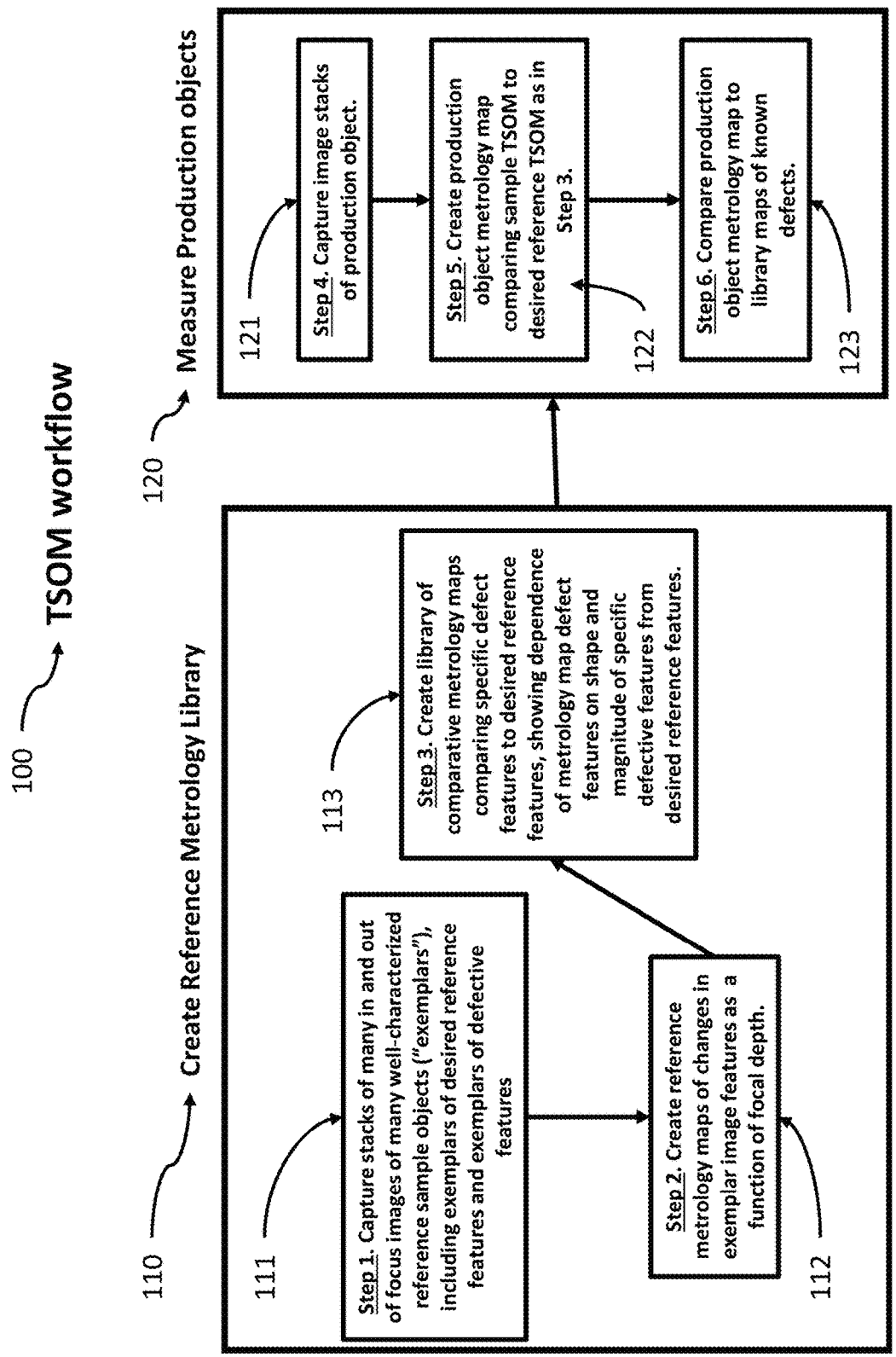
FIG. 1 (prior art) is a diagram depicting the workflow of TSOM metrology.

The inventors of the subject matter in this disclosure include an inventor of the Fresnel Incoherent Correlation Holography (FINCH) techniques and systems that are described in, for example, U.S. Pat. No. 8,179,578 Filed Jul. 18, 2006. The inventors of FINCH also published several papers describing the FINCH system and technique. See, for example, Joseph Rosen and Gary Brooker, "Digital spatially incoherent Fresnel holography", Optics Letters, Vol. 32, No. 8, Apr. 15, 2007. The contents of U.S. Pat. No. 8,179,578 and the publication "Digital spatially incoherent Fresnel holography" are each incorporated by reference in their respective entireties.

The inventors of the subject matter described in this application, amongst others, subsequently improved upon the original FINCH technique described in U.S. Pat. No. 8,179,578, leading to, in one particular improved implementation, using one or more birefringent lenses in association with FINCH in order to achieve super resolution in the obtained holographic images. U.S. Pat. No. 10,228,655 (which claims priority to U.S. Provisional Application No. 61/886,064 filed on Oct. 3, 2013) describes FINCH using a liquid crystal lens (which is also birefringent). The use of a birefringent crystal lens in FINCH was described in a provisional application that was filed May 1, 2014, which was subsequently claimed priority to in patent applications US Patent Application Publication Nos. 20170242398, 20170185036, 20170052508, and U.S. Pat. No. 10,289,070. This novel use of a birefringent lens in FINCH was also described in Nisan Siegel, Vladimir Lupashin, Brian Storrie and Gary Brooker, "High-magnification super-resolution FINCH microscopy using birefringent crystal lens interferometers", Nature Photonics, 14 Nov. 2016. Further developments in the phase shifting procedure used in the recording of FINCH holograms is described in PCT patent application No. PCT/US20201040683 as well as in Nisan Siegel and Gary Brooker, "Single shot holographic super-resolution microscopy," Optics Express 29, 15953-15968 (2021). The contents of U.S. Pat. Nos. 10,228,655, 10,289,070, US patent applications publication Nos. 20170242398, 20170185036, 20170052508, "High-magnification super-resolution FINCH microscopy using birefringent crystal lens interferometers," PCT/US20201040683, and "Single shot holographic super-resolution microscopy" are each incorporated by reference in their respective entireties. While the incorporated documents provide a thorough explanation of FINCH, a brief description of FINCH is provided below for convenience. One skilled in the art will realize that while the following discussion is recited in the context of visible light, any other wavelengths of electromagnetic radiation can be used similarly with imaging components optimized for said other wavelengths. One skilled in the art will further realize that discussion of line widths is intended as an exemplary metrology characteristic and that therefore the teachings herein apply equally to metrology of other shape and dimensional characteristics including spatial dimensions, orientations, curvatures, surface roughness and smoothness, interfaces and other characteristics.

Figure 3:
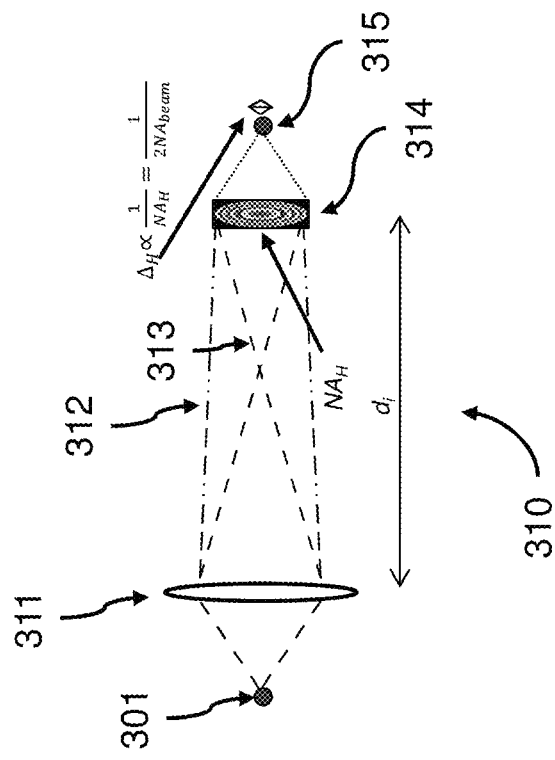
FIG. 3 (prior art) is a diagram comparing FINCH imaging to standard widefield imaging.
Figure 3:
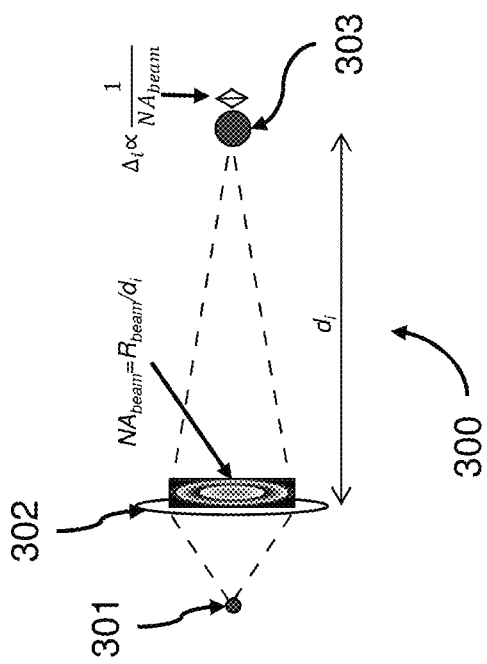

FINCH (FIG. 3) is a unique incoherent holographic method that does not require coherent illumination or complicated and lossy reflective or diffractive optics. In standard imaging, depicted in 300, a beam propagates from an object 301 to its image 303 with a single phase curvature at any given location in space, and only one plane of the imaged object is in focus at any given time. By contrast, in FINCH 310, an object 301 is imaged by a lens 311 that creates a set of two co-propagating beams 312, 313 from the light received from each individual point in the sample, with each of the beams having a different focal length. The beams interfere with each other, since they are co-linear and each of the beam pairs originates from the same point in the object, assuring both spatial and temporal coherence on a point by point basis. Because of the short coherence of incoherent light, light from different points on the object do not interfere with one another, which is why FINCH is termed an incoherent interference method. The 2D FINCH hologram 314 recorded by a FINCH camera is the linear sum of the holograms of all the different points. Different planes in the object will produce measurably different holograms on the camera. The interference fringes in the FINCH hologram 314 are related—by well-known relationships—in their position and size to the 3D positions of the points in the object from which they originated, and the fringes may be computationally processed to recover the phase (dependent on the 3D shape) of the object. This 3D phase may be computationally processed (refocused) to reconstruct an image 315 of the object at any 3D position. Thus, it can be seen that FINCH enables the collection of a 3D stack of images in a single 2D hologram recording, indicating the potential to gather optical measurement data in a single 2D hologram capture without any required motion that in the TSOM state of the art requires many image captures with inter-capture motion of the object or camera. Note in particular that the hologram 314 has a much larger spatial extent on the image detector (i.e. covers many more pixels on a CCD or CMOS or similarly pixelated camera) than the comparable focused image 303. In effect, this means that the FINCH hologram contains many more measurements of the single object point than a standard focused image does. Furthermore, as discussed in some of the documents incorporated by reference, the maximum optical resolution of a FINCH lens is twice as good as the optical resolution of a classical lens because the angular magnification of FINCH is only half that of the lateral magnification. FINCH is an all-optical super-resolution technique that requires only some simple image computation to produce far better images than classical methods. FINCH imaging is especially advantageous for optical measurement since it is an extremely simple imaging method that captures the entire phase (3D information) of a sample, in a single shot, without an expensive or difficult illumination procedure, and with no need for prior sample knowledge or a training step in the image reconstruction. There is only one beam path, so imaging stability is extremely high. Furthermore, the construction of the FINCH lens is easy to optimize for various optical metrology requirements, including wavelength range, magnification, field size, and sampling requirements.

The improved resolution of FINCH is another aspect that is advantageously applied to TSOM metrology; as the metrology resolution is dependent on the imaging method resolution, the improved image resolution extends the measurement precision of TSOM optical metrology beyond nanometer (nm) scale into the sub nm range.

Figure 2:
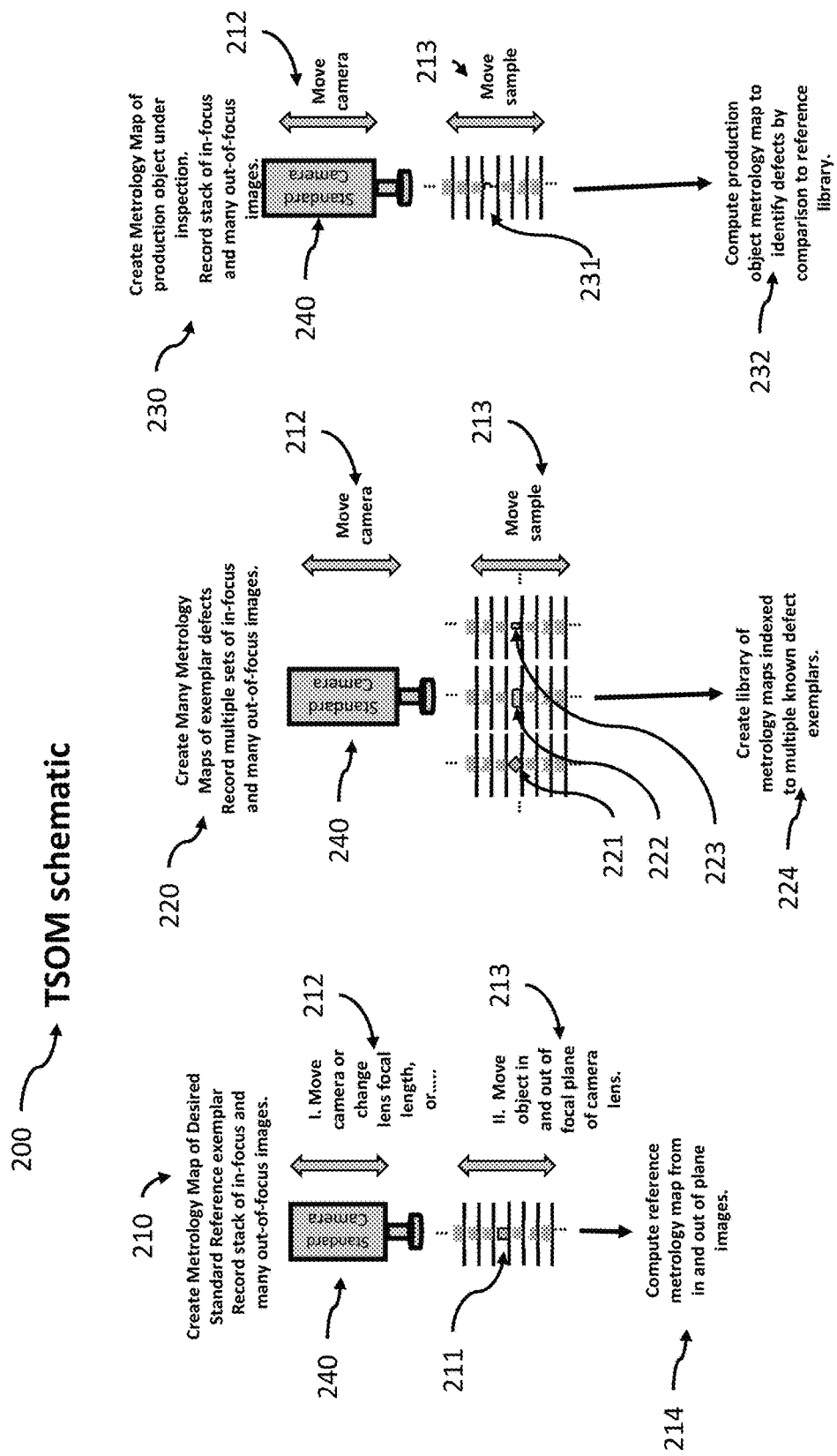
FIG. 2 (prior art) is a schematic of a TSOM metrology operation.
Figure 4:
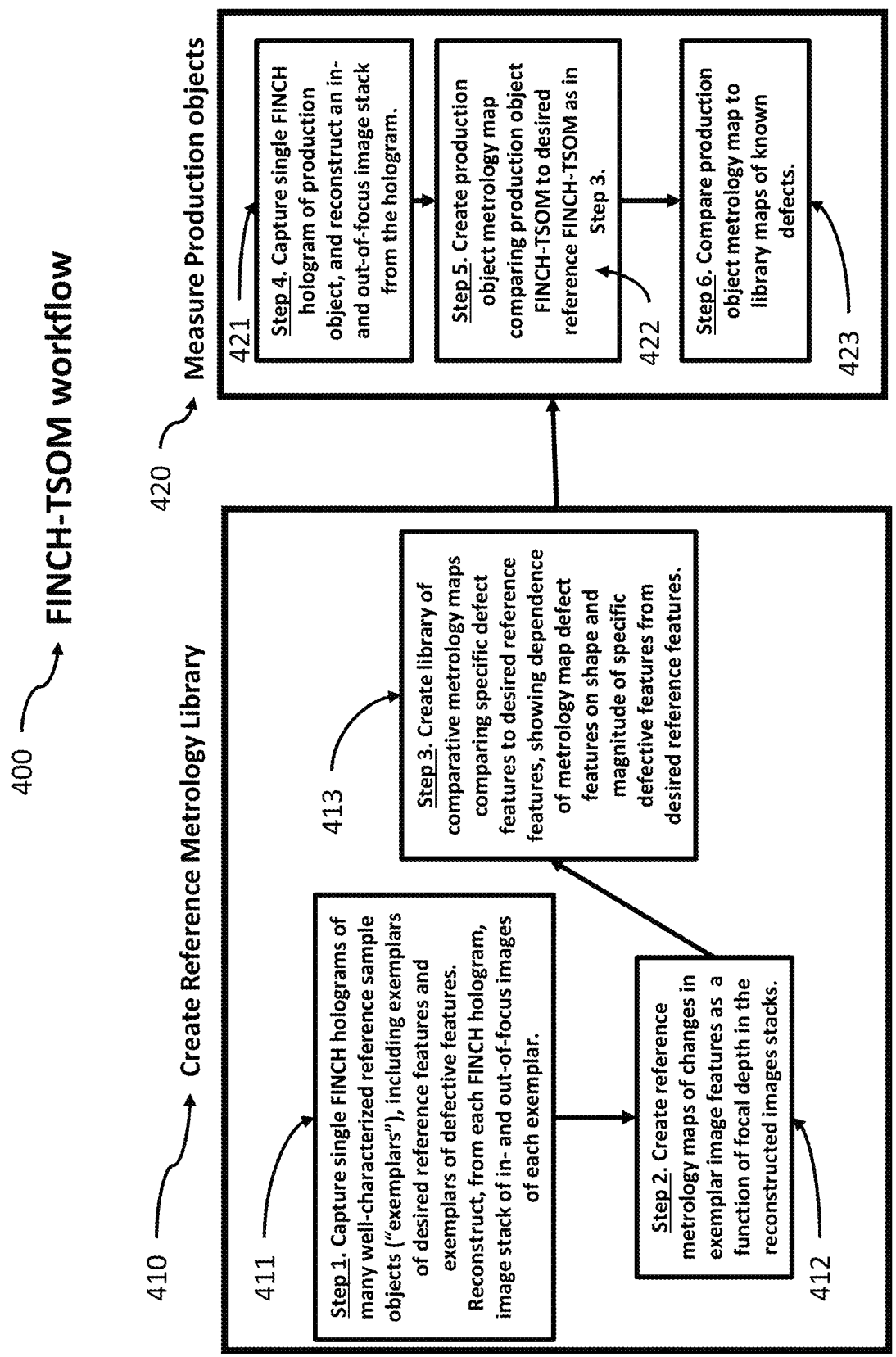
FIG. 4 is a diagram depicting the workflow of FINCH-TSOM metrology, according to some example embodiments.
Figure 5:
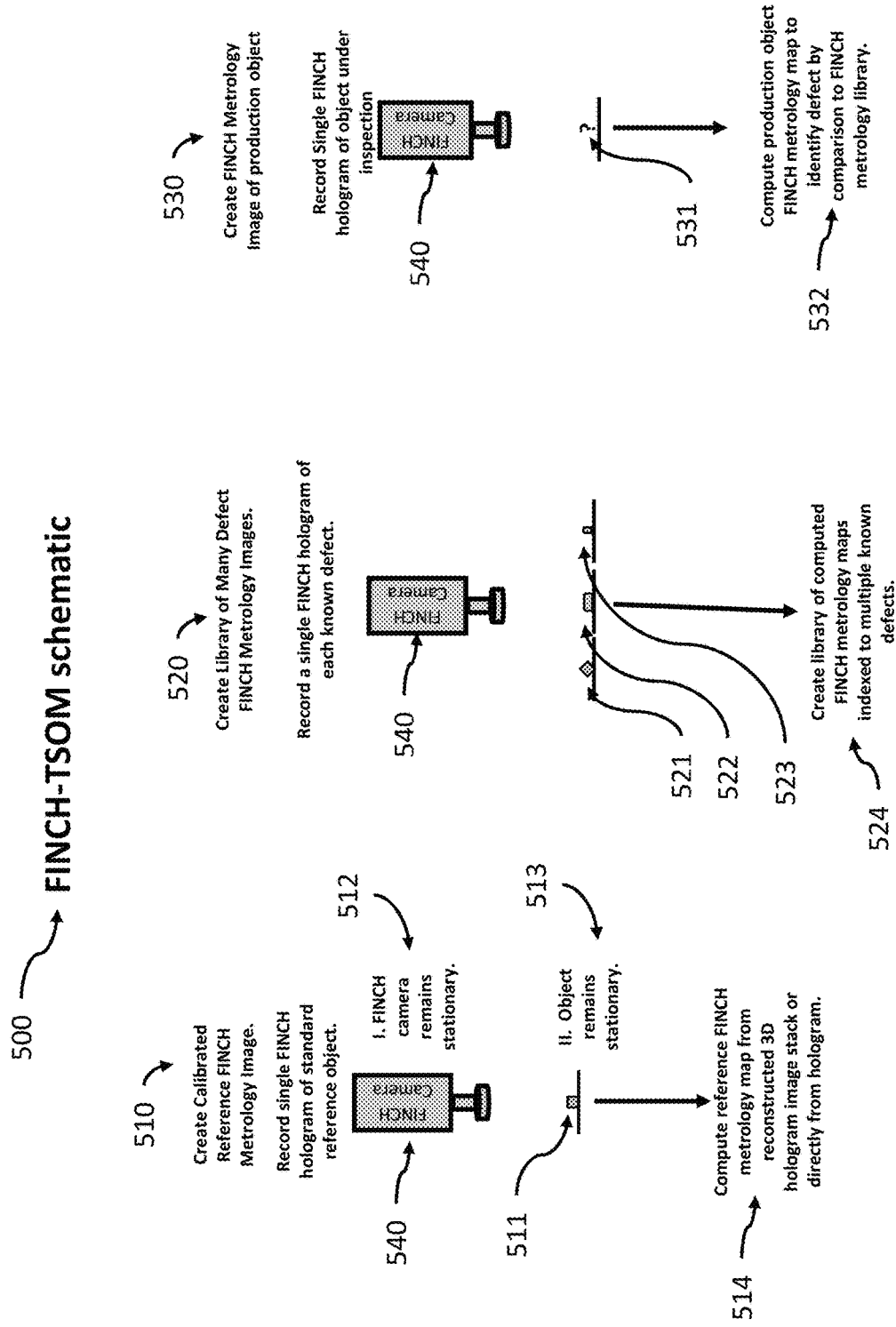
FIG. 5 is a schematic of a FINCH-TSOM metrology operation, according to some example embodiments.

In one embodiment, identified as FINCH-TSOM, a FINCH hologram of the object under inspection is recorded on a FINCH camera 540, and then computationally refocused to all the planes that a typical TSOM scan would use (without any motion needed to acquire an equivalent stack of images), and then a TSOM image is constructed from this propagated image stack. See FIGS. 4 and 5, showing analogous steps to those in FIGS. 2 and 3 for the standard TSOM, including operations 411, 412, 413 (of the create reference metrology library operation 410 of the FINCH-TSOM workflow 400) and operations 510, 520 building metrology reference libraries 514, 524 of desired features 511 and defective features 521, 522, 523, enabling operations 421, 422, 423 (of the measure production objects operation 420 of the FINCH-TSOM workflow 400), and operations 530 collection and assessment of metrology data 532 from features of the object 531 under inspection. This imaging is to be done both for the reference object and the library of known defective objects, and subsequently for the manufacturing samples under test, just as in standard TSOM.

Figure 6A:
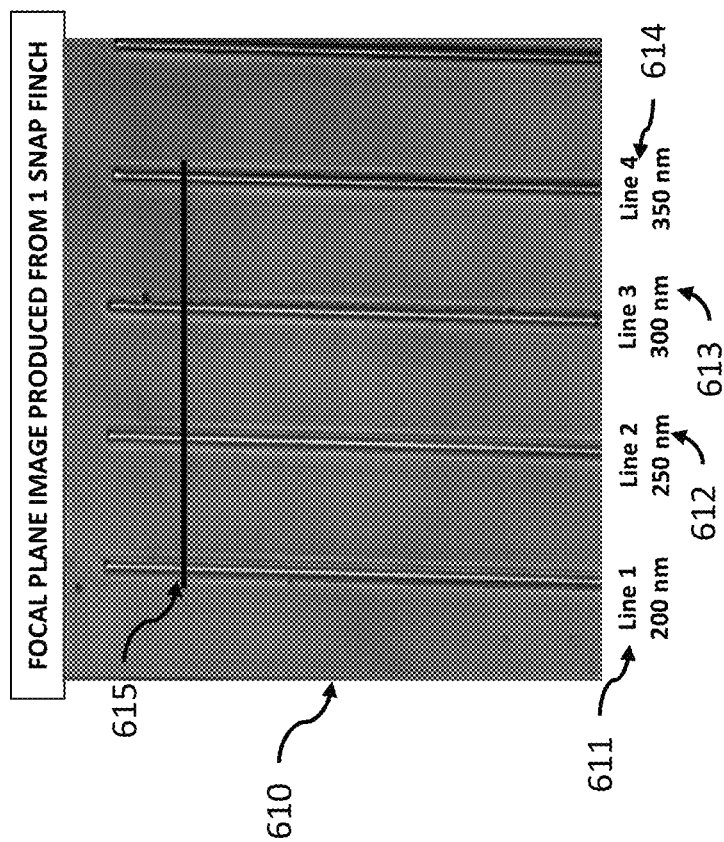
FIG. 6A depicts a FINCH image of a sample silicon wafer structure, according to some example embodiments.
Figure 6B:
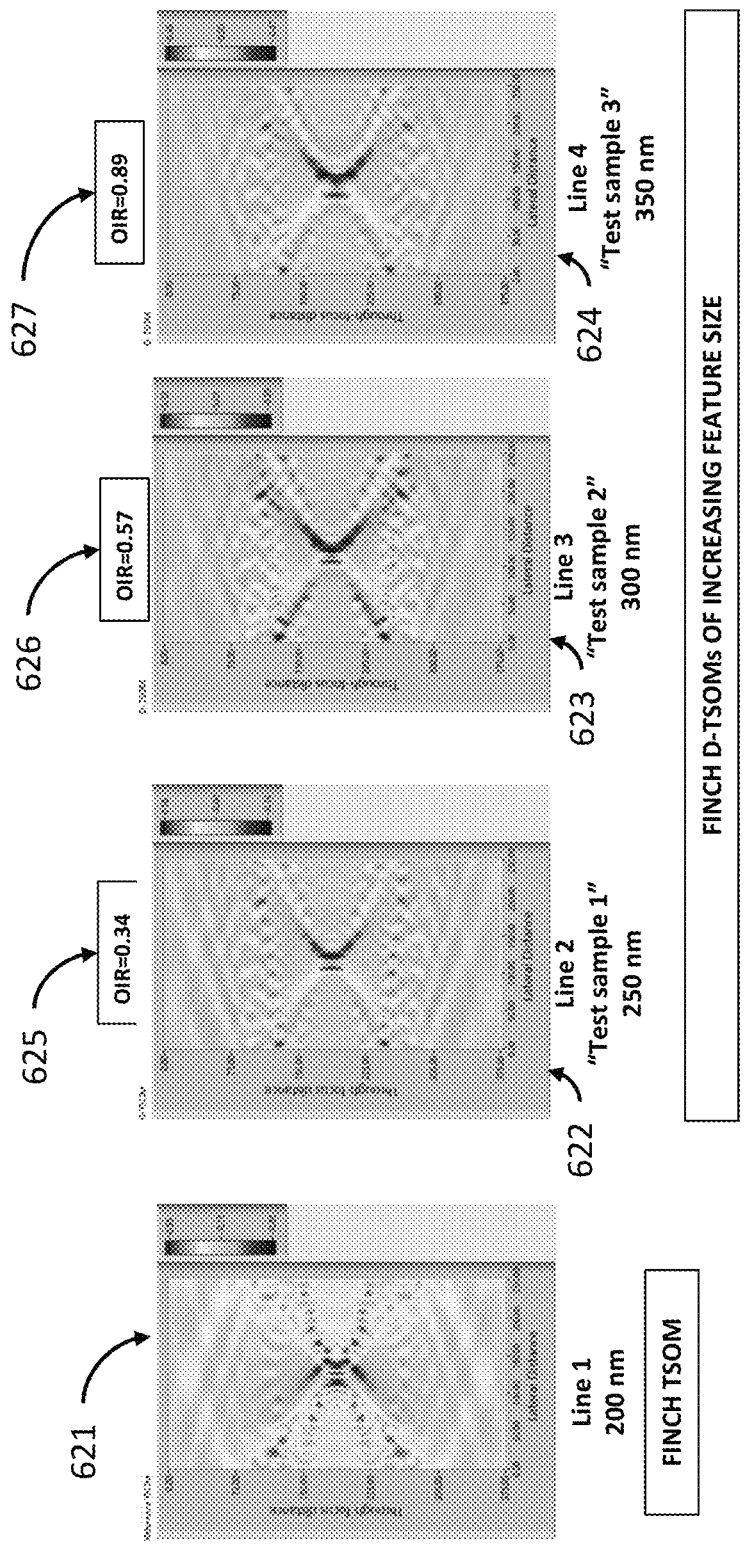
FIG. 6B depicts FINCH-TSOM metrology maps made on a sample silicon wafer structure, according to some example embodiments.
Figure 6C:
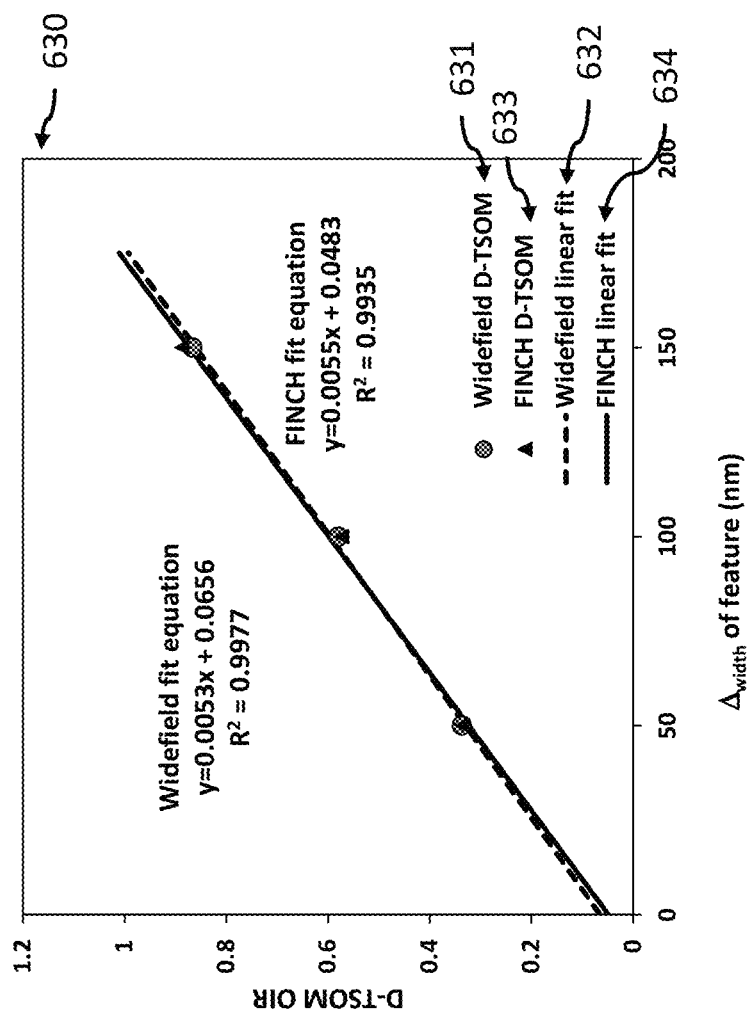
FIG. 6C depicts FINCH-TSOM OIR measurements made on a sample silicon wafer structure, according to some example embodiments.

The inventors have performed measurements of the type envisioned in this embodiment of FINCH-TSOM using a FINCH imaging system, and have found that the measurement accuracy is at least comparable to traditional TSOM. The FINCH imaging system was similar to the one reported in "Single shot holographic super-resolution microscopy", though a 40×0.75 NA (numerical aperture) objective was used in place of the high NA objectives of that paper, and the illumination was reflection-mode imaging of 465 nm light rather than fluorescence excitation. The illumination NA was reduced to approximately 0.1 by restricting the aperture stop diaphragm of the reflected light illumination. The low illumination NA and 0.75 objective NA combine to reduce the classical optical resolution to features larger than ~530 nm (Abbe limit) or 667 nm (Rayleigh limit). FIG. 6A displays an exemplary metrology sample object 610 with defined structural features of lines of varying widths in a wafer. The widths were 200, 250, 300, and 350 nm for lines 1-4 611, 612, 613, 614, respectively. Note that these are all sub-resolution features, considering the numerical aperture considerations detailed above. As expected, no apparent difference in the line widths is seen in the in-focus image. Shown in FIG. 6B are the FINCH TSOM image 621 of the smallest line, used as the standard "desired" reference, and then the three D-TSOM images 622, 623, 624 of lines 2-4, (each increasing by 50 nm in width) which were used as the "test" samples. The TSOM data were extracted from line profiles taken at the positions indicated by the line 615. In this simplified proof-of-concept work, an entire reference library was not created, as the goal was to show the capability of FINCH TSOM to create D-TSOM images that sensitively represented sub-resolution feature differences; showing test D-TSOM images that were clearly and systematically different from the desired reference TSOM serves as proof of concept that a library could be created that could be used to identify unknown features. These TSOM and D-TSOM images (or metrology maps) were calculated by the methods described above. The OIR (optical image range) from the D-TSOM calculations from the stacks of images generated from the FINCH holograms indicated in the Figure is a measure of the image contrast in the TSOM image; higher OIR in the D-TSOM image means greater difference in the object being measured. The patterns in the D-TSOM images are all qualitatively similar and characteristic of changes in the width of the structures, demonstrating the ability to decode the type of differences in the test objects. The OIR values are quantitatively significantly different between 622, 623, 624, enabling the assessment of the magnitude of the difference as well as its type. The OIRs that were measured for these structures (633 and 634 plotted in 630 shown in FIG. 6C) suggest in this experiment that FINCH-based TSOM has a metrology resolution of 20 nm or better, similar to data 631, 632 captured using a widefield TSOM image as in the conventional techniques but only requiring the capture of a single image.

Figure 7:
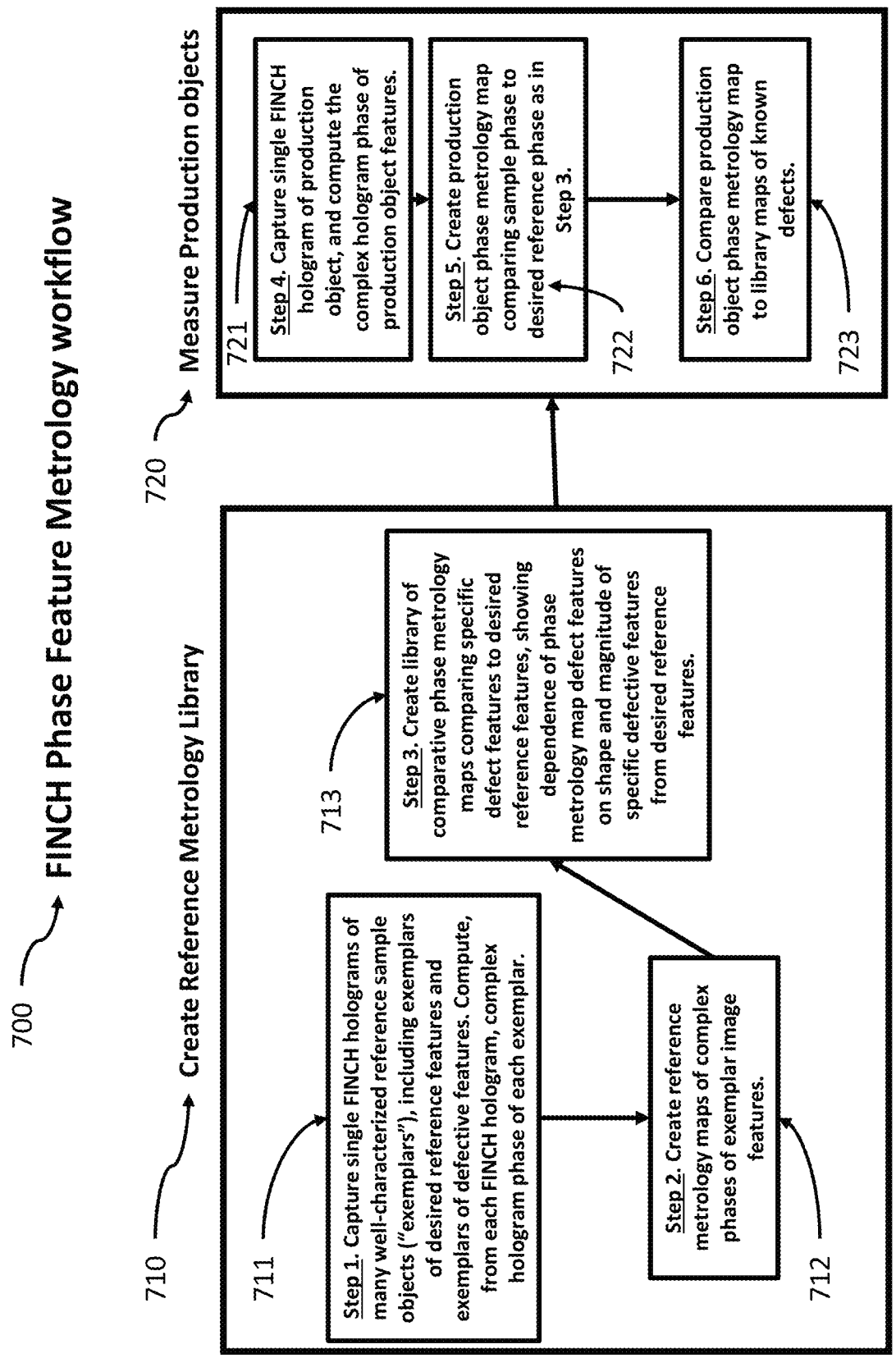
FIG. 7 is a diagram depicting the workflow of FINCH Phase Feature Metrology, according to some example embodiments.
Figure 8:
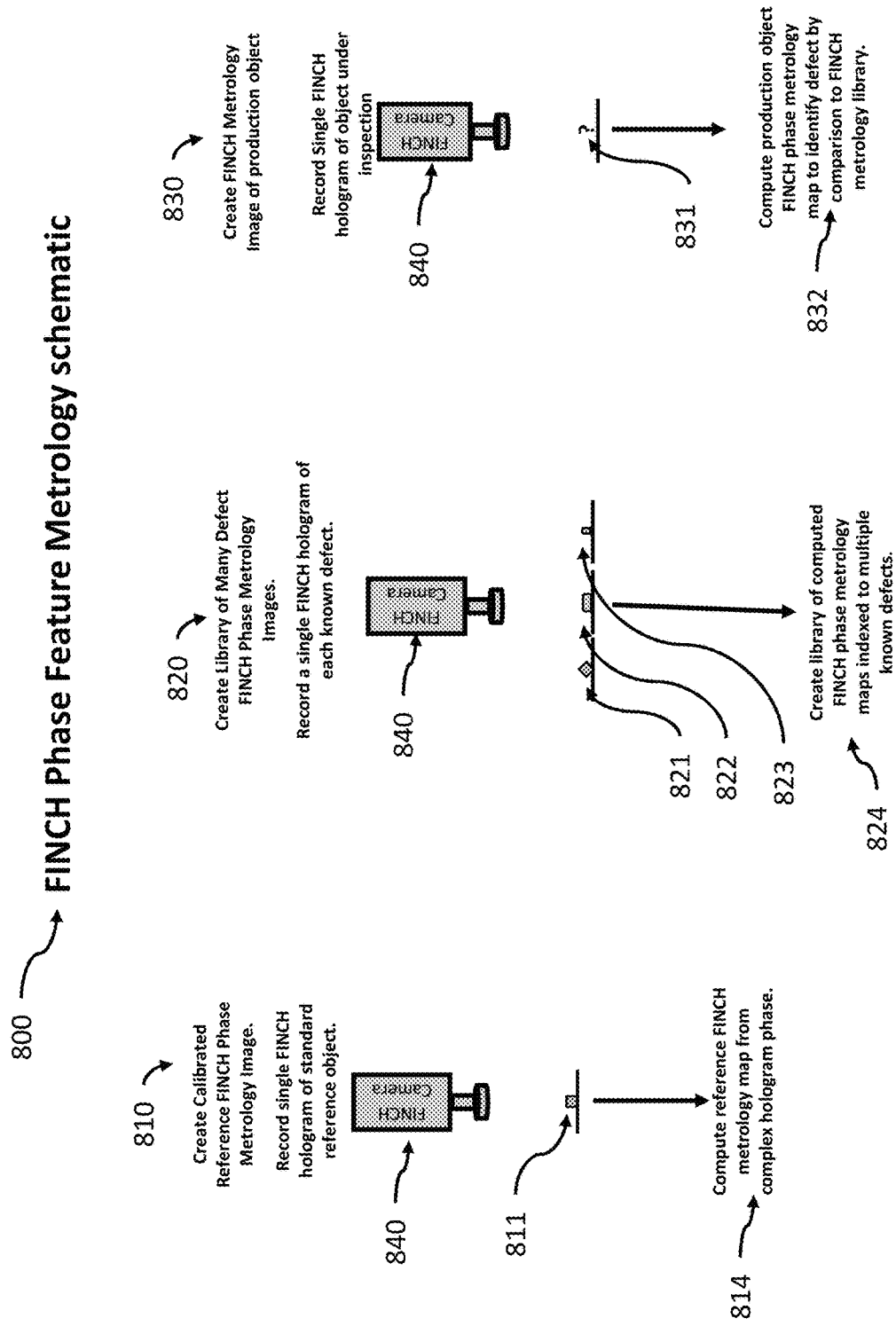
FIG. 8 is a schematic of a FINCH Phase Feature Metrology operation, according to some example embodiments.

In another embodiment of the method, known as FINCH Phase Feature Metrology, it is not necessary to go to the extent of reconstructing the various images at different planes in order to create TSOM and D-TSOM images. Since all the unique 3D information in the propagated stack is contained exclusively in the hologram complex phase which is computed from the recorded hologram, it is also possible to use the manufacturing sample hologram directly to create a measurement referenced to the hologram complex phase of a calibrated perfect reference sample without creating a TSOM image. For example, the complex phase of a feature in an object under inspection can be directly subtracted from the complex phase of the desired reference sample feature. See FIGS. 7 and 8, showing analogous steps to those in FIGS. 2 and 3 for the TSOM prior art, including operations 711, 712, and 713 (of the create reference metrology library operation 710 in a FINCH phase feature metrology workflow 700), and operations 810 and 820 (shown in FINCH phase feature metrology schematic 800) building Phase Feature Metrology reference libraries 814, 824 of desired 811 and defective 821, 822, 823 features, enabling operations 721, 722 and 723 (of operation measure production objects 720 of the FINCH phase feature metrology workflow 700), and 830 collection and assessment of Phase Feature Metrology data 832 from features of the object 831 under inspection. This imaging is done both for the reference object and the library of known defective objects, and subsequently for the manufacturing samples under test, just as in standard TSOM. In such a case, there additionally might not need to be a library of known defect images to calibrate the manufacturing test measurements, as differential phase measurements could be directly translated into physically meaningful sub-resolution images.

Figure 9:
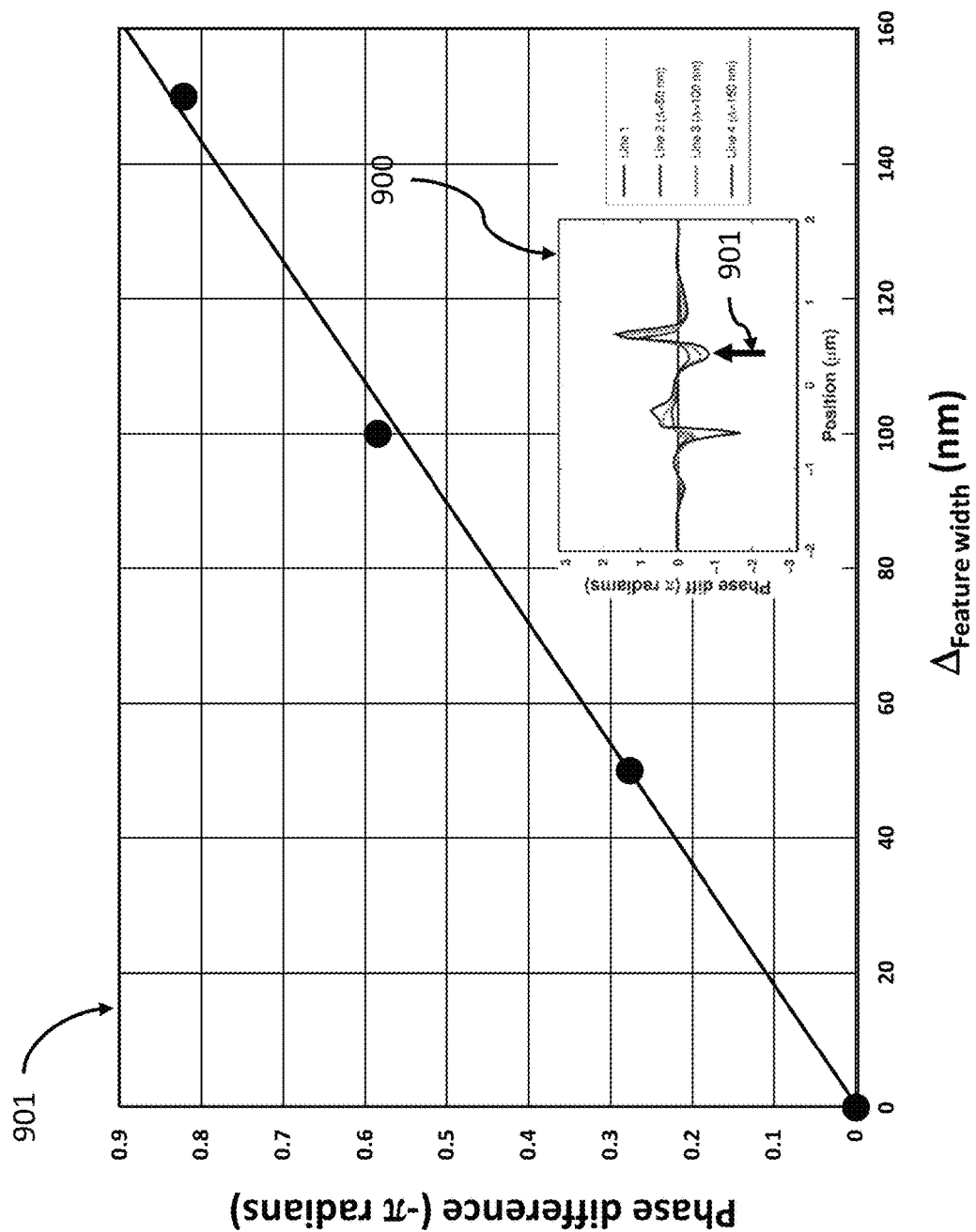
FIG. 9 depicts FINCH Phase Feature Metrology measurements made on a sample silicon wafer structure, according to some example embodiments.

The inventors also performed measurements of the type exemplified by the embodiment of FINCH Phase Feature Metrology, the results of which are shown in FIG. 9. Instead of FINCH-TSOM metrology maps, the complex phases of the line features in 610 were used as the metrology maps. The line profiles through the FINCH hologram phases of the four test sample feature lines 611-614 shown in 610 are plotted against each other in 901, with the reference phase of line 1 611 having been first subtracted from all the profiles. The magnitude of the phase difference shown in 900 at the position indicated by the arrow 901 are plotted in 902. The resulting differential phase shows a clear and systematic increase with increasing line size differential, showing that metrology of extremely small features of at least an order of magnitude smaller than the Rayleigh limit can be performed by the embodiment of FINCH Phase Feature Metrology.

Figure 10:
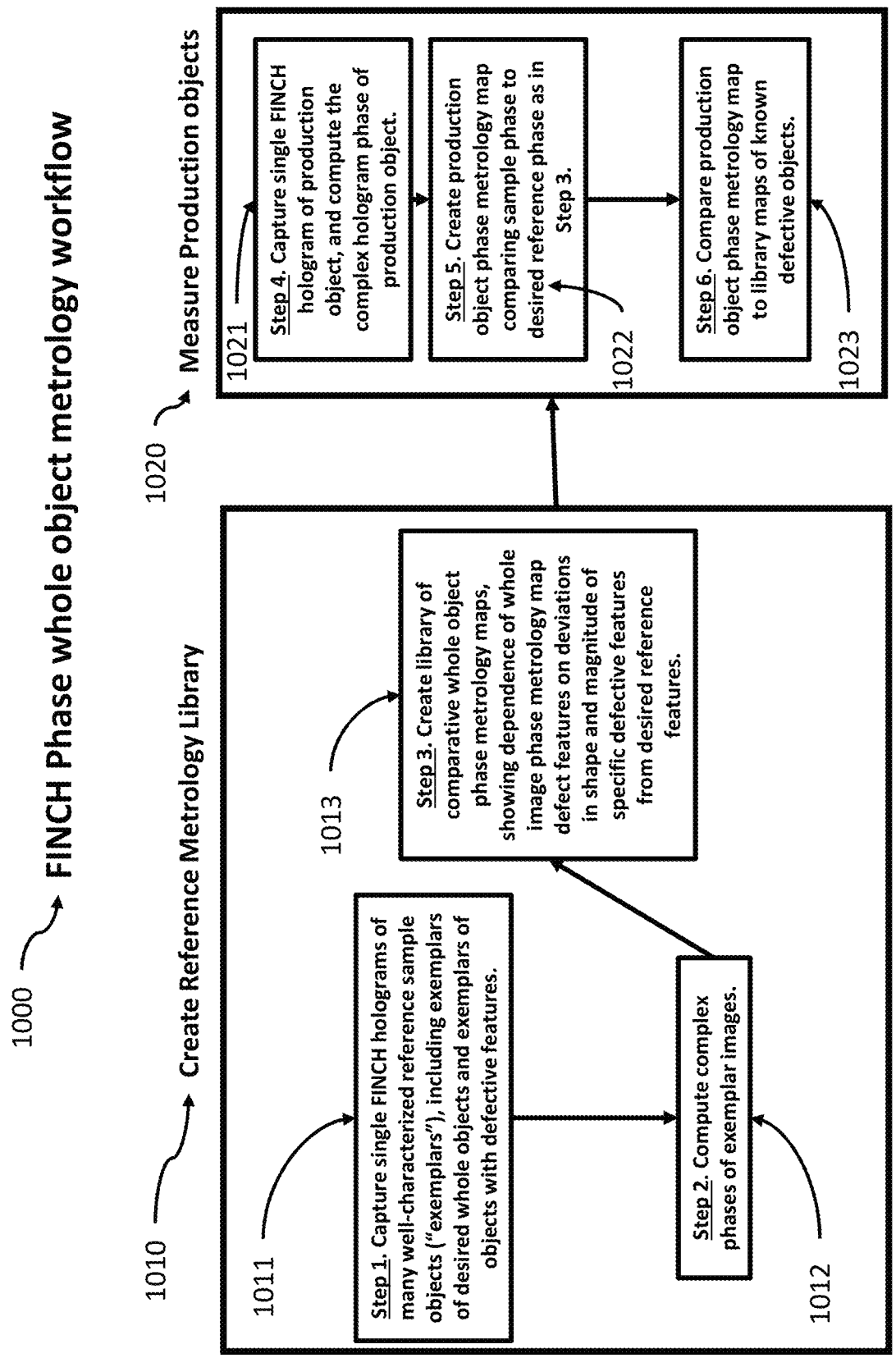
FIG. 10 is a diagram depicting the workflow of FINCH Phase Whole Object Metrology, according to some example embodiments.
Figure 11:
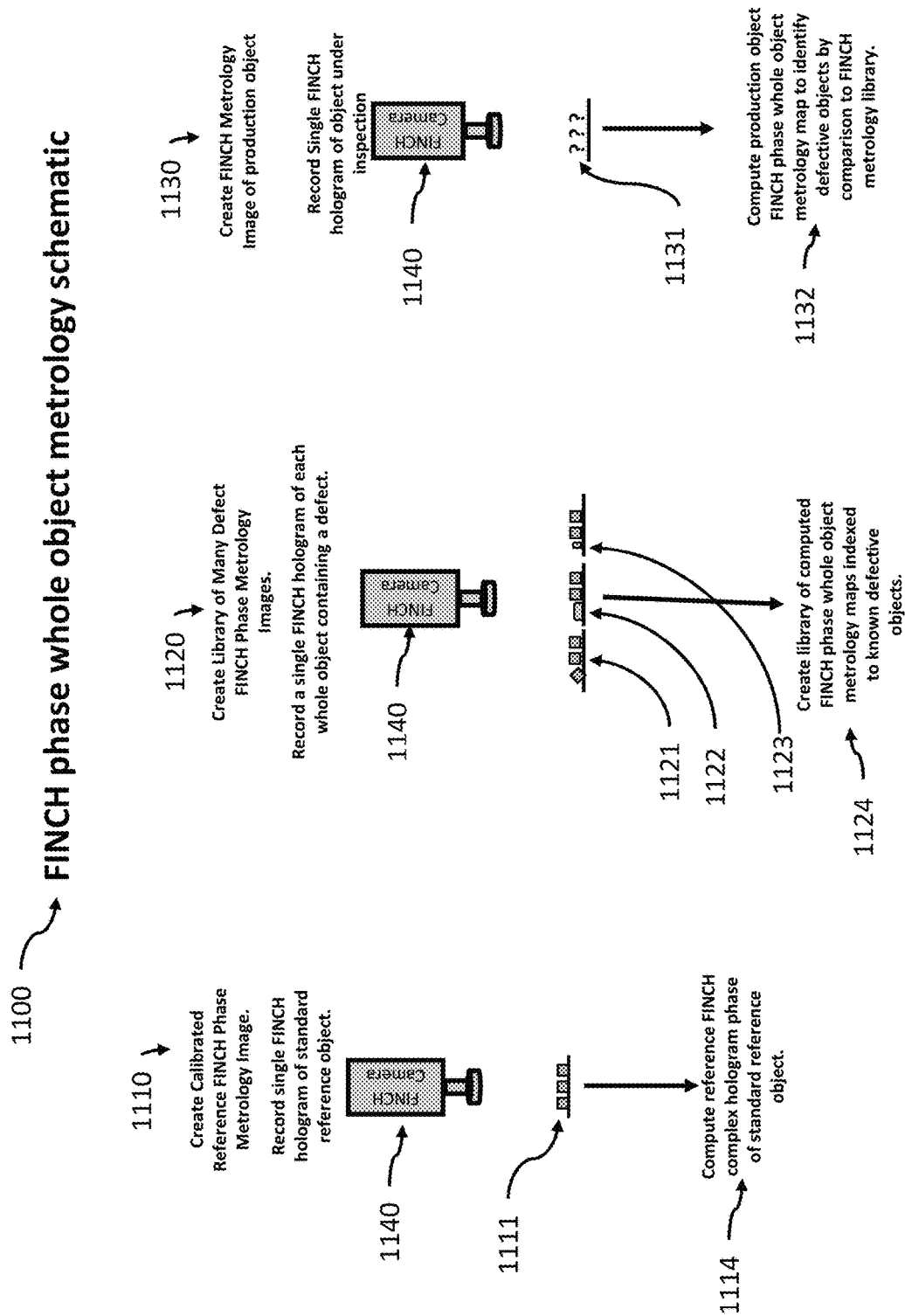
FIG. 11 is a schematic of a FINCH Phase Whole Object Metrology operation, according to some example embodiments.

In another embodiment of the method, called FINCH Phase Whole Object Metrology, the phase of a whole sample object is recorded and compared against the phase of a calibrated reference sample, without selecting and excerpting the phase of a particular feature of interest. By extension of the reasoning of the earlier embodiment of FINCH Phase Feature Metrology, and consistent with the results shown in FIG. 9, it is also clear from this data that subtraction of entire hologram complex phase images of objects under inspection from reference sample complex phase images is also capable of producing sub-diffraction metrology. For example, subtraction of the complex phase of a reference object hologram from the complex phase of a test object hologram can be used to spatially indicate differences between two objects at metrology resolution far higher than optical imaging resolution. This type of measurement can be used in applications such as in production part inspection, to make sure that entire manufactured parts do not deviate from the design. See FIGS. 10 and 11, showing analogous steps to those in FIGS. 1 and 2 for the TSOM prior art, including operations 1011, 1012 and 1013 (of the create reference metrology library operation 1010 in the FINCH phase whole object metrology workflow 1000), and operations 1110, 1120 building Phase Whole Object Metrology reference libraries 1114, 1124 of desired 1111 and defective 1121, 1122, 1123 objects, enabling operations 1021, 1022 and 1023 (of the measure production objects operation 1020 in the FINCH phase whole object metrology workflow 1000), and operation 1130 collection and assessment of Phase Whole Object Metrology data 1132 from features of the object 1131 under inspection using FINCH system camera 1140. This imaging is done both for the reference object and the library of known defective objects, and subsequently for the manufacturing samples under test.

Figure 12:
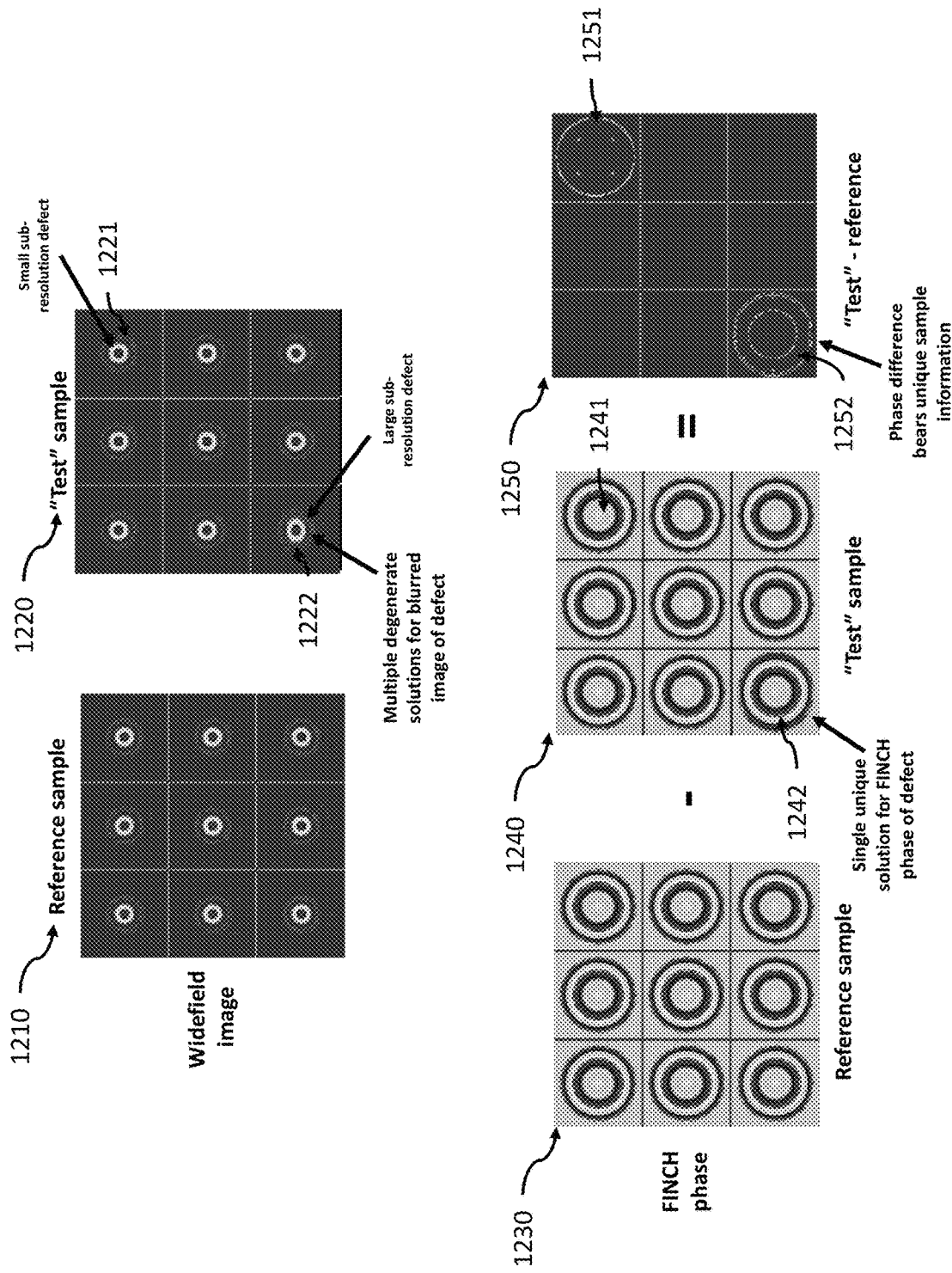
FIG. 12 depicts simulated FINCH Phase Whole Object Metrology measurements, according to some example embodiments.

A simulation (shown in FIG. 12) was performed to illustrate the concept of this embodiment, organized in the form of nine microchip dies on a silicon wafer. A single point was used as the standard reference feature, and closely-spaced pairs of points were used to simulate defective object features. A reference image was created of nine of these reference features in the middle of the simulated dies. This is shown in 1210. In 1220 is shown a similar image, with a small simulated defect 1221 and a large simulated defect 1222 in the upper right and lower left corners as indicated. The small defect 1221 comprised a pair of points separated by 25 nm replacing the single point, while the large defect 1222 comprised a pair of points separated by 100 nm in place of the single point. The image of the small defect is, to the human eye, indistinguishable from the standard object, while the large defect is just barely discernible as having a slight horizontal blur. Since the defects are well below the resolution limit, it is not possible to determine the structure of the defect. There are multiple defects that can produce that blur degenerately in a 2D image, so comparison of the reference sample image 1210 to the test sample 1220 does not indicate a unique solution that represents knowledge of the specific defect causing the blur. Without some 3D information such as might be gathered in a TSOM data set, there is no way to be sure what is the nature of the defect. In 1230 and 1240, the FINCH phases of the objects 1210 and 1220 are shown. In FINCH, each hologram phase, including any defect phase, contains 3D information and is produced by only one type of object, and there are no degenerate solutions that can produce the phase patterns in the positions containing the small and large defects. Therefore, phase difference images can be constructed by subtracting the standard phase from the test phase and the result 1250 can be used as a reliable measure of both the scale and nature of the defect. The Phase Whole Image Metrology images 1251 and 1252 are significantly different from each other and are unique to their particular defects, and therefore can be used as a quantitative and qualitative measure of the discrepancies of the objects 1221 and 1222 from the perfect desired reference objects in 1210. This is the full-image version of the line plots in 901, showing that the entire phase images of objects can be used to perform sub-diffraction metrology on large manufacturing or other metrology samples in a single shot. The nature of the FINCH hologram, which spreads the image information about any object point into many points in the recorded image, enables sensitive measurements of minute variations in the object structure. It is furthermore possible to reconstruct the phase difference term or its complex valued original hologram equivalent (including amplitude) to directly visualize information about the sample and its defects. While the discussion of the embodiment of FINCH Phase Whole Object Metrology is recited in terms of isolated defects located in portions of the object that are isolated from each other, one skilled in the art will realize that defects in close spatial proximity, that produce overlapping characteristic FINCH phase patterns, can also be analyzed in a similar manner for metrology purposes. The complex phases of neighboring points add in the hologram of an entire object so that each Whole Object Phase image is still a unique solution describing a particular object with a particular unique structure.

There are a number of computational methods that can create extremely accurate simulated images of objects incorporating nm-level features of object size and shape as well as all optical system characteristics including all optical components, polarization, phase effects, illumination and imaging numerical aperture, wavelength of imaging and optical defects. These methods include but are not limited to the Fourier Modal Method and methods that apply extremely precise computations of Maxwell's Equations for any given optical system and object under imaging. It is possible to use these methods to create extremely accurate simulated FINCH complex hologram phases of the reference objects, and thereby eliminate the need to collect a library of reference phase metrology maps. While it is possible to create simulated reference data using this idea for standard metrology as well, note that in practice, the noise in the recorded focused image will cause discrepancies from the ideal that the simulations do not account for, as the limited spatial extent of the focused image of any object point will cause random noise to drown out the subtle differences in the image that subresolution defects can cause. And even if a simulated reference TSOM library can be created, for example, it would still be necessary to collect TSOM data by scanning the test object through the focus of the imaging system, which was noted earlier as an undesirable characteristic. FINCH metrology is again different as the hologram spreads out the image data from any single object point over a large spatial extent, leading to many more pixels of measurement data for every object point. This increases the potential utility of creating simulated Phase Metrology reference maps.

Figure 13:
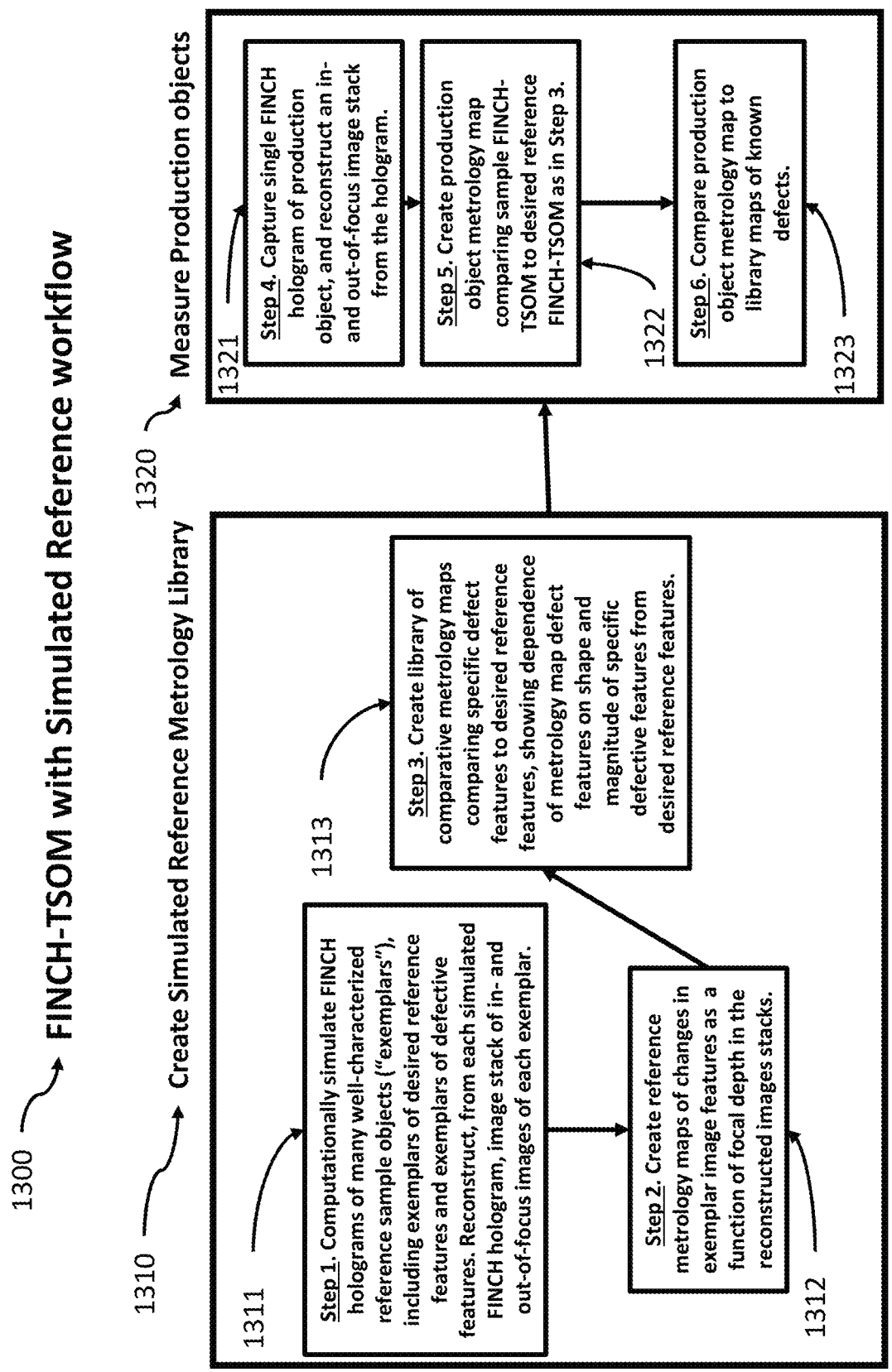
FIG. 13 is a diagram depicting the workflow of FINCH-TSOM Metrology with Simulated Reference, according to some example embodiments.

Accordingly, another embodiment of the invention, identified as FINCH-TSOM Metrology with Simulated Reference, uses simulated reference data for both desired and defective exemplars, as created using extremely accurate computational methods such as the Fourier Modal Method. In this embodiment (shown in FIG. 13 as a FINCH-TSOM with simulated reference workflow 1300 comprising operations create simulated reference metrology library 1310 and measure production objects 1320), a library of simulated reference data is created in operations 1311-1313 (analogous to 411-413) and used in operations 1321-1323 along with empirically gathered FINCH data of the object under inspection, in order to assess the quality of the object.

Figure 14:
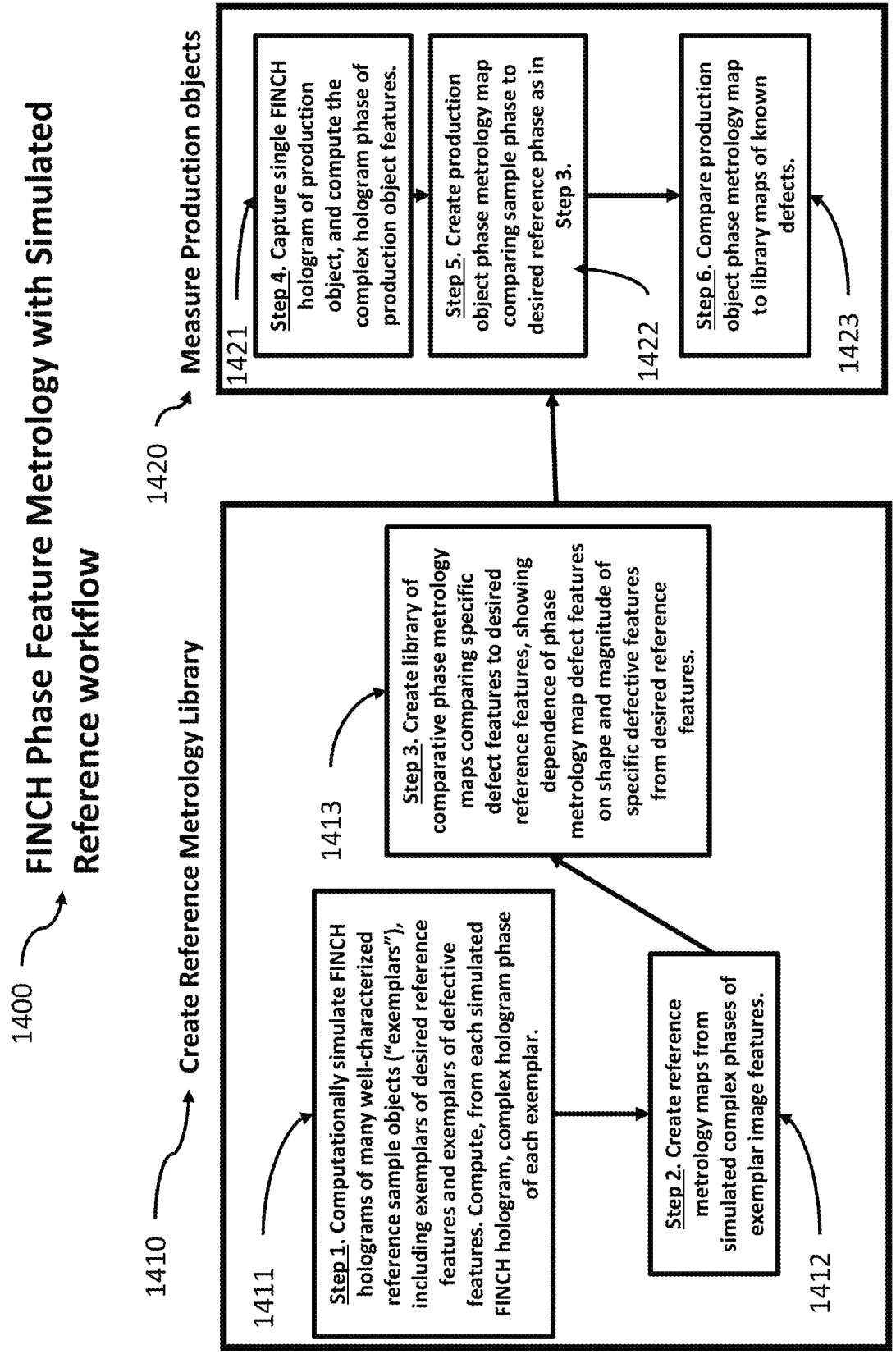
FIG. 14 is a diagram depicting the workflow of FINCH Phase Feature Metrology with Simulated Reference, according to some example embodiments.

Another embodiment of the invention, identified as FINCH Phase Feature Metrology with Simulated Reference, uses simulated reference data for both desired and defective exemplars, as created using extremely accurate computational methods such as the Fourier Modal Method. In this embodiment (shown in FIG. 14 as a FINCH phase feature metrology with simulated reference workflow 1400 comprising operations create simulated reference metrology library 1410 and measure production objects 1420), a library of simulated reference data is created in operations 1411-1413 (analogous to 711-713) and used in operations 1421-1423 along with empirically gathered FINCH data of the object under inspection, in order to assess the quality of the object.

Figure 15:
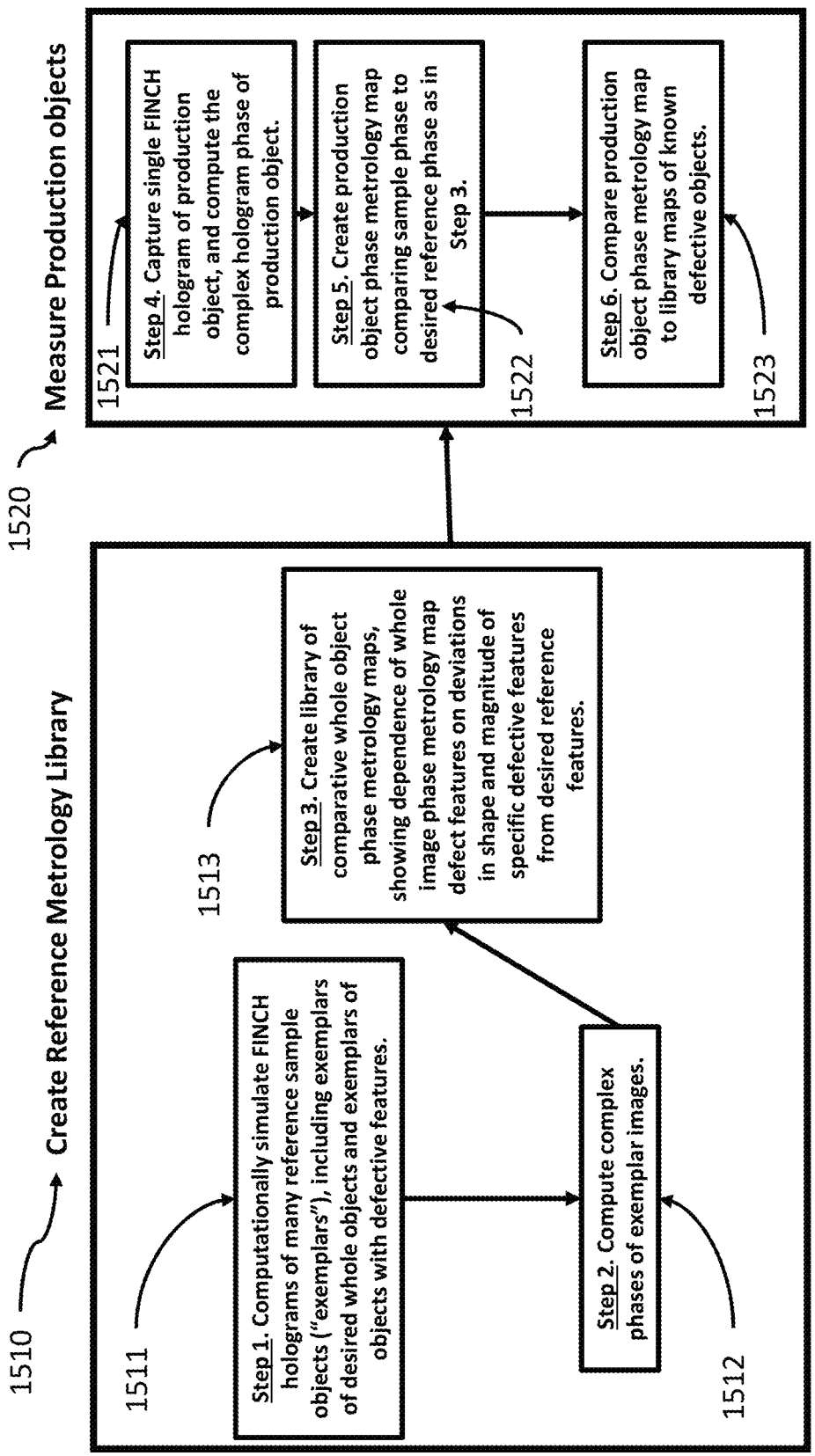
FIG. 15 is a diagram depicting the workflow of FINCH Phase Whole Object Metrology with Simulated Reference, according to some example embodiments.

Another embodiment of the invention, identified as FINCH Phase Whole Object Metrology with Simulated Reference, uses simulated reference data for both desired and defective exemplars, as created using extremely accurate computational methods such as the Fourier Modal Method. In this embodiment (shown in FIG. 15 as a FINCH phase whole object metrology with simulated reference workflow 1500 comprising operations create simulated reference metrology library 1510 and measure production objects 1520), a library of simulated reference data is created in operations 1511-1513 (analogous to 1011-1013) and used in operations 1521-1523 along with empirically gathered FINCH data of the object under inspection, in order to assess the quality of the object.

The ability to computationally create simulated FINCH holograms with extreme accuracy also means that metrology can be performed without using any reference library at all. For example, consider a recorded FINCH hologram of an object under inspection. The detailed manufacturing plan of the object can be used to simulate a FINCH hologram of the desired object for comparison to the recorded FINCH hologram. If the comparison between the simulated and recorded holograms results in a poor match in any particular area, the simulated hologram can be iteratively adjusted by iteratively changing the data in the manufacturing plan in that particular area until the match is closer (e.g., the difference-image intensity between the recorded FINCH hologram of the production part and the simulated FINCH hologram of the iteratively adjusted manufacturing plan is below a preconfigured threshold level of intensity). Then, the final iterated manufacturing plan can be accepted as the actual structure of the object under test. The deviations in the final iterated manufacturing plan can then be used to assess the quality of the object under inspection and assign it a quality score.

Figure 16:
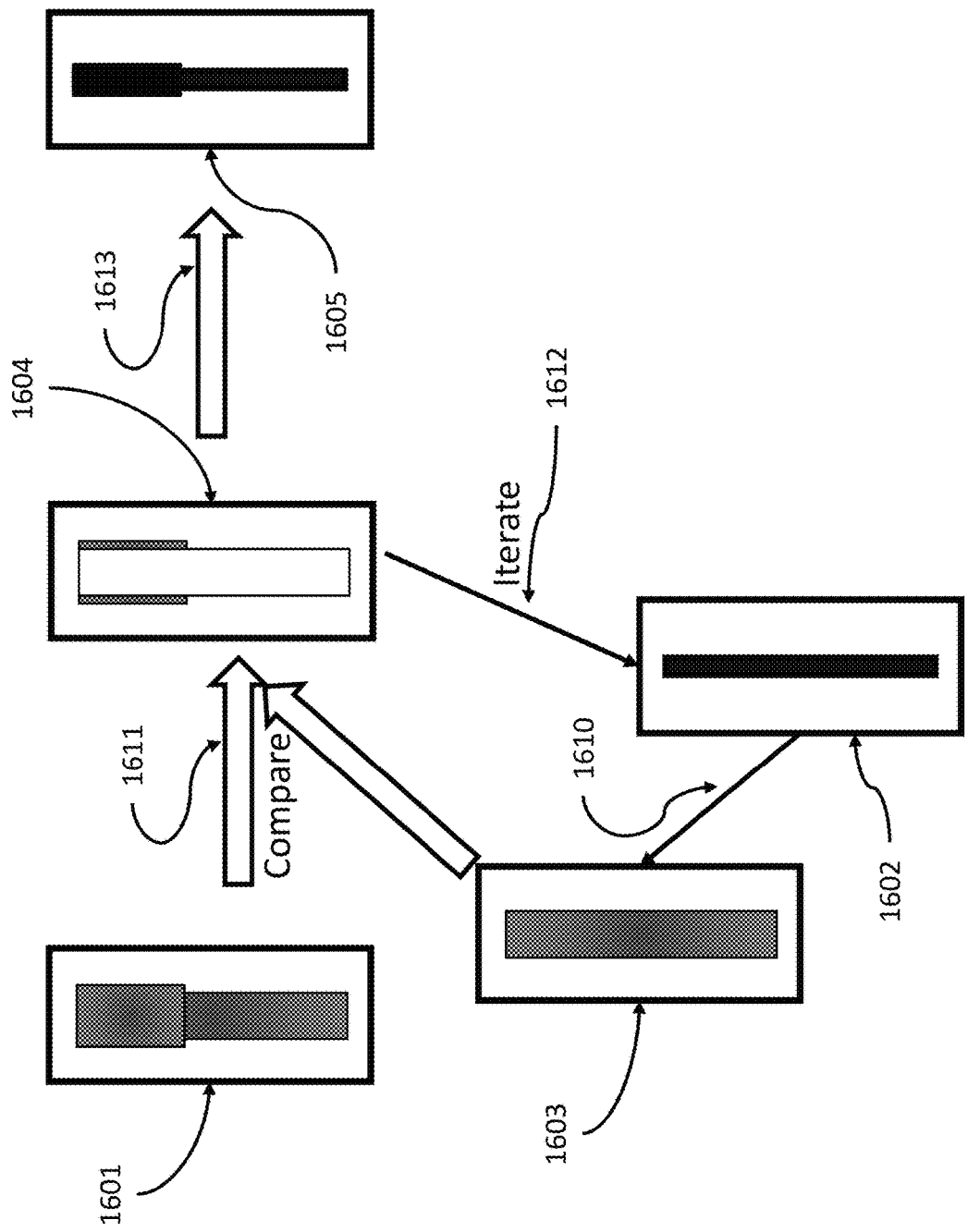
FIG. 16 is a schematic depicting the use of iteratively adjusted simulated reference holograms to assess a metrology object under inspection, according to some example embodiments.

Accordingly, in another embodiment of the invention, a recorded FINCH hologram of an object under inspection is used to create a complex phase metrology map of the object, which is then analyzed by comparison to a high-quality simulated reference metrology map based on the manufacturing plan of that object. For example, consider in FIG. 16 a recorded hologram 1601 of an object consisting of a line. In the manufacturing plan 1602, the line is specified as 100 nm wide. A simulated hologram of extreme accuracy 1603 is generated from the manufacturing plan 1602 by computational process 1610 of the sort discussed above. The simulated hologram 1603 is compared 1611 to the recorded hologram 1601 and, based on the comparison, it is found 1604 that the recorded hologram differs in the top region of the hologram image. The manufacturing plan is then iteratively changed 1612 by for example broadening or shrinking the line in that area of the manufacturing plan until the simulated and recorded hologram match to a high degree. The final iterated manufacturing plan 1605 (for example, with the top portion of the line actually 105 nm wide instead of 100 nm) is accepted as the measurement of the actual object under inspection, and the quality assessor determines if the defect is passable or requires the object to be rejected. In an embodiment, the quality assessment includes automatically comparing the measurement of the actual object under inspection or parameters derived therefrom to one or more preconfigured threshold values to determine the object's pass or reject status.

If a z-stack of FINCH holograms is recorded by moving (z-stepping) the object through the focal plane of the FINCH imaging system and recording FINCH holograms with the different planes of the object at the focal plane, it is possible to generate different metrology maps from reconstructed image stacks originating in each z-stepped hologram. These different metrology maps may then be used to generate more metrology data about the sample than, for example, a classical TSOM image. This contrasts with a standard image z-stack, which can only generate a single TSOM image since it is not possible to use classical images recorded at any number of planes to reconstruct images at any other plane.

Figure 17:
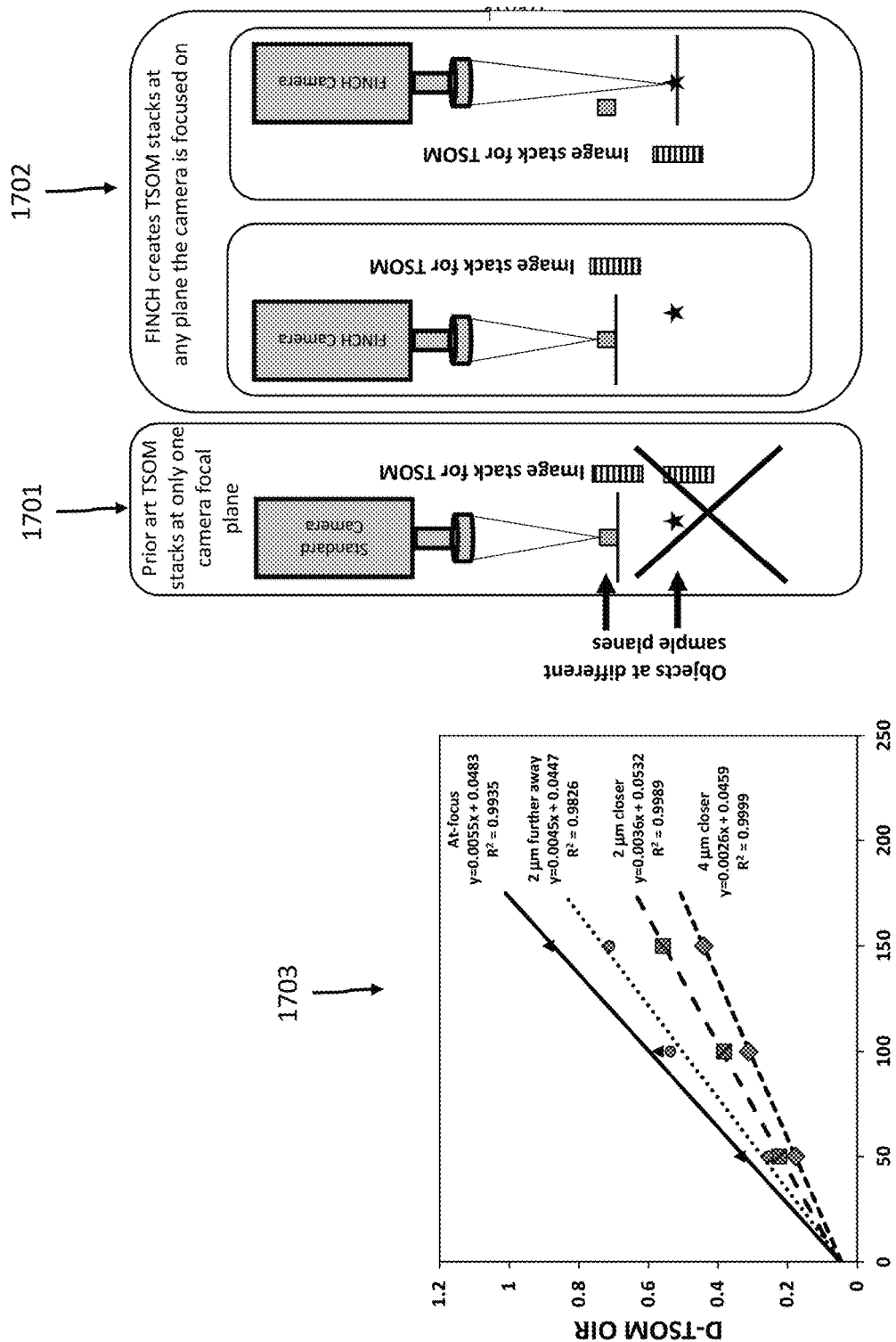
FIG. 17 includes diagrams of recording multiple FINCH metrology maps with an object at multiple different image recording planes, with results of a set of such measurements, according to some example embodiments.

Accordingly, another embodiment of the invention includes capturing multiple different FINCH metrology maps, with the object under inspection being moved through the focal plane of the FINCH imaging system. Each recording plane produces a different perspective in the FINCH metrology reference and object metrology maps that are used to infer information about the object with even greater precision than FINCH metrology maps generated from a single imaging plane. FIG. 17 shows a general schematic 1701 indicating that only one metrology map can be generated from a single recorded image stack. Another schematic 1702 shows that each recorded plane in a FINCH image stack can be reconstructed to its own FINCH-TSOM image, meaning that multiple TSOM images can be generated from a single FINCH image stack consisting of FINCH holographic recordings of multiple planes of focus. The plot 1703 shows examples of this type of data. A stack of FINCH images of the metrology sample 610 was captured with the sample at focus, as well as at 2 microns further away from the FINCH system and 2 and 4 microns closer to the FINCH system than the focal plane. Each of these four images was used to create FINCH-TSOM and D-TSOM data, and the OIR values are plotted in 1703. The plot shows consistent differences in the OIR plot slopes that can be related to both the nature of the features in the sample as well as to the potion of the sample in relation to the focal plane of the system. Thus this embodiment provides additional metrology information that can be used to determine the features of the object.

In all of the above teachings and drawings it is understood that the term FINCH camera or FINCH optical system incorporates a plurality of lenses, mirrors, polarization optics, camera, microscope frame or attachment and any other elements required to record a FINCH hologram as described in the incorporated references. The FINCH camera or FINCH optical system further incorporates a computer control system with one or more processors that controls the operation and function of the FINCH camera or FINCH optical system such as image capture, illumination, timing, storage of recorded images and all other required data. The computer control system also incorporates processing devices, data storage devices, data and software necessary to perform image recording processing and the metrology workflows and operations including creation of reference metrology maps whether recorded as in the steps delineated in 410, 710, or 1010 or simulated as in the steps delineated in 1310, 1410, or 1510, creation of production object metrology maps and comparison to reference metrology maps as in the steps delineated in 420, 720, 1020, 1320, 1420, or 1520, original manufacturing plans and methods for creating iteratively adjusted manufacturing plans as in the steps delineated in FIG. 16.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A metrology method for determining the manufacturing quality of an object under inspection, comprising:
   recording, using a FINCH camera controlled by a computer comprising one or more processors, a FINCH hologram of an object under inspection;
   creating, using the one or more processors, an extremely accurate simulated reference hologram from the manufacturing plan of the object;
   comparing, using the one or more processors, the recorded hologram to the simulated hologram;
   iteratively adjusting, using the one or more processors, the manufacturing plan and simulated hologram until the comparison of the recorded and simulated holograms is within a specified tolerance;
   accepting the final iterated manufacturing plan as the measured structure of the object under inspection; and
   assessing whether said measured structure passes quality assessment.

2. A metrology method for determining the manufacturing quality of an object under inspection, comprising:
   recording, using a FINCH camera controlled by a computer comprising one or more processors, multiple FINCH holograms of an object under inspection, with the object located at different planes relative to the focal plane of the imaging system;
   creating, using the one or more processors, metrology maps of the object at each imaging plane;
   comparing, using the one or more processors, the object metrology maps to reference metrology maps generated under similar physical or simulated computational positions; and
   assessing the manufacturing quality of the object based on said comparisons.

3. The metrology method according to claim 1, wherein the simulated hologram incorporates nm-level features of object size and shape.

4. The metrology method according to claim 1, wherein the simulated hologram comprises one or more simulated FINCH complex hologram phases of a reference object.

* * * * *